Sept. 15, 1931.  D. S. DE LAVAUD  1,823,092
POWER TRANSMITTING DEVICE AND ITS APPLICATION TO DIFFERENTIAL GEARS
Filed July 12, 1929   11 Sheets-Sheet 1

D. Sensaud de Lavaud
INVENTOR

By: Marks & Clerk
Attys.

Sept. 15, 1931.  D. S. DE LAVAUD  1,823,092
POWER TRANSMITTING DEVICE AND ITS APPLICATION TO DIFFERENTIAL GEARS
Filed July 12, 1929   11 Sheets-Sheet 2

D. Sensaud de Lavaud
INVENTOR

By: Marks & Clerk
ATTY

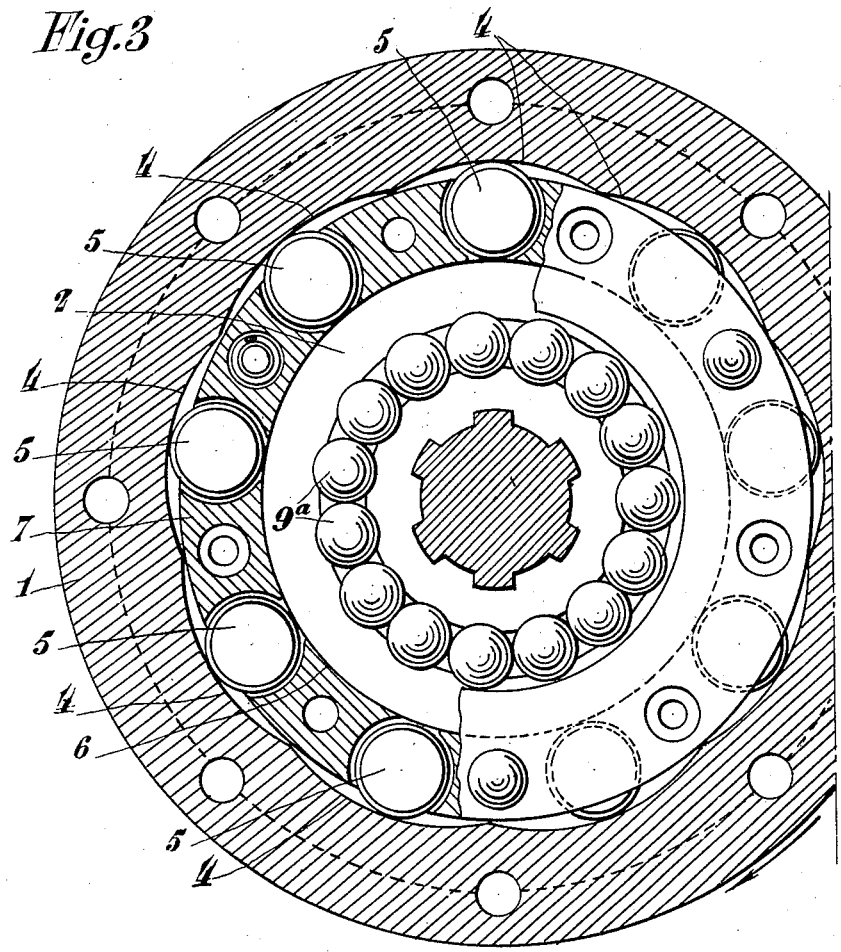
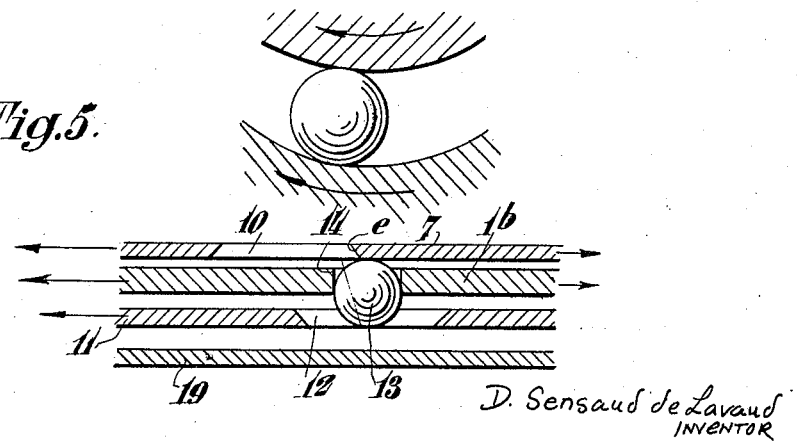

D. Sensaud de Lavaud
INVENTOR

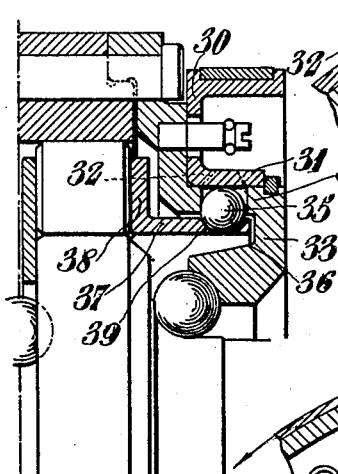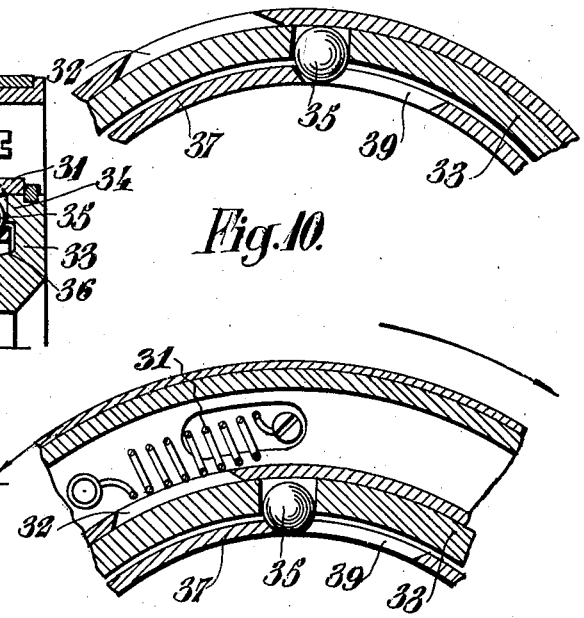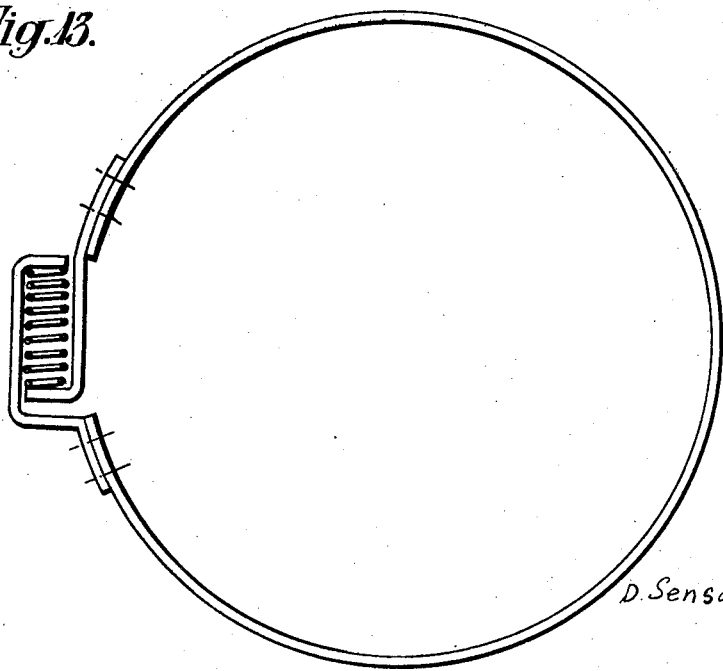

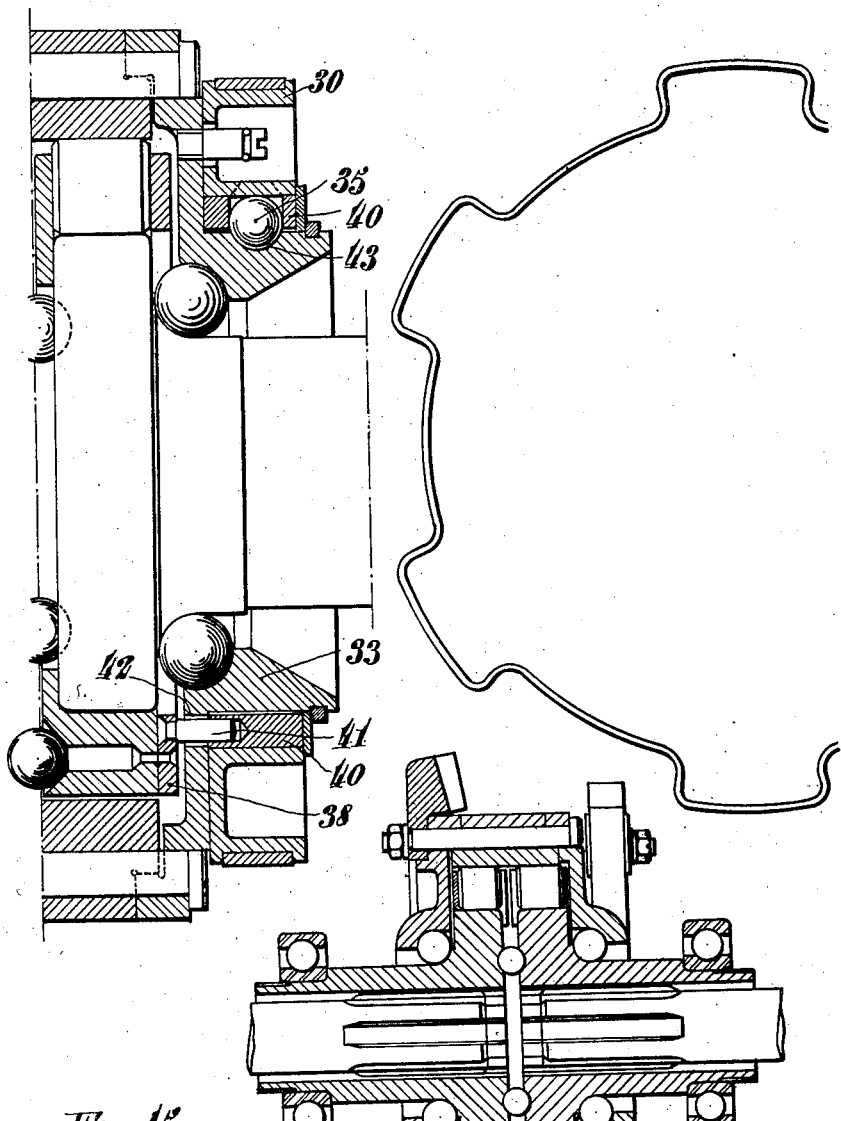

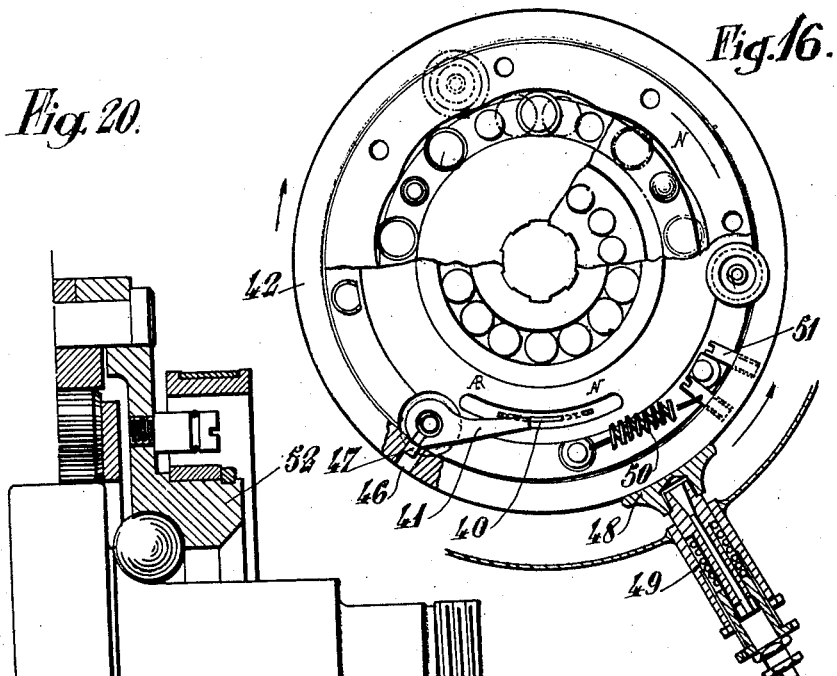

Sept. 15, 1931. D. S. DE LAVAUD 1,823,092
POWER TRANSMITTING DEVICE AND ITS APPLICATION TO DIFFERENTIAL GEARS
Filed July 12, 1929   11 Sheets-Sheet 8

D. Sensaud de Lavaud
INVENTOR

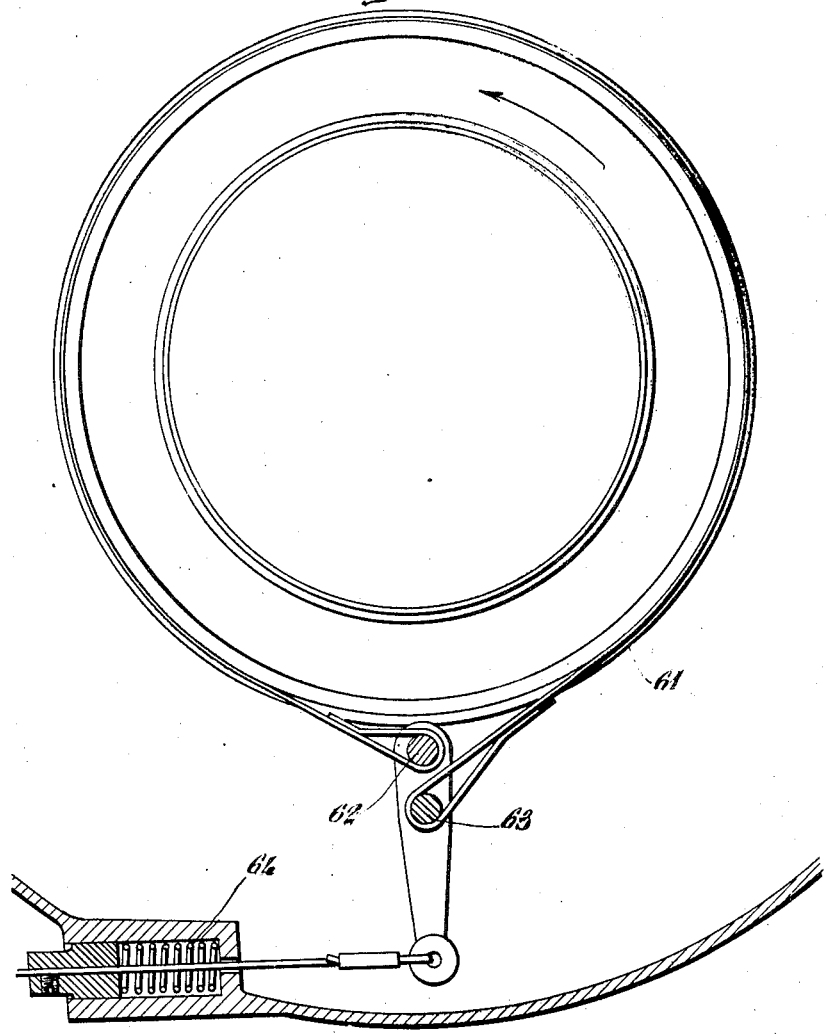
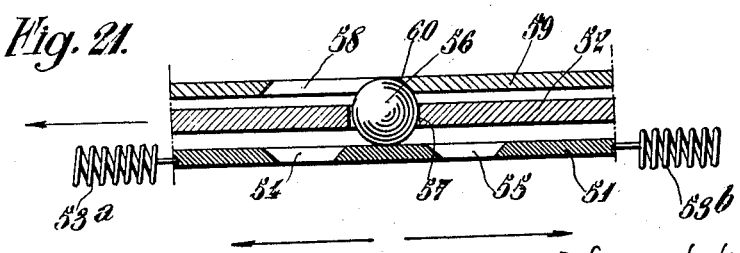

Patented Sept. 15, 1931

1,823,092

UNITED STATES PATENT OFFICE

DIMITRI SENSAUD DE LAVAUD, OF PARIS, FRANCE, ASSIGNOR TO DE LAVAUD HOLDINGS CORPORATION, LIMITED, OF LONDON, ENGLAND, A CORPORATION OF GREAT BRITAIN

POWER TRANSMITTING DEVICE AND ITS APPLICATION TO DIFFERENTIAL GEAR

Application filed July 12, 1929, Serial No. 377,885, and in France July 27, 1928.

The present invention relates to devices for the mechanical transmission of power from a source of generation to a point where it is to be utilized and it is particularly applicable to the transmission of the power of the engine to the wheels or similar motive means of a motor vehicle.

A primary feature of the invention is the provision of an improved form of coupling between driving and driven members which will, when desired, permit free rotation of the driven member independently of the driving member under certain conditions but which may be controlled manually to provide a positive connection under all conditions. As applied to a motor vehicle the construction may be such, for example, that the engine may normally be connected to effect driving of the wheels; however, when the wheels and their associated parts are rotating at a more rapid rate than would correspond with the speed of the engine at a given instant, the wheels will rotate without attempting to drive the engine and hence without the braking effect of the engine. This free wheeling action may, according to the present invention, be eliminated under manual control whenever desired and it may also be made ineffective or be automatically disabled when the car is driven in reverse.

In the preferred form of the invention the coupling or clutching together of the driving and driven members is effected through rollers or equivalent devices which are adapted to be wedged between two coaxially mounted surfaces upon slight relative movement between the rollers and one or both of the surfaces, one of which is connected with the driving member and the other with the driven member. The normal cooperation of the parts is such that a driving relation exists between the two members for either direction of rotation of the members. This driving relation may, however, be destroyed by suitably maintaining the rollers, or the like, in a neutral position with reference to the two wedging portions of one of the coaxial surfaces. One of these wedging portions, it will be understood, will serve to effect driving in one direction and the other in the opposite direction, assuming that the driving member is operating at a greater speed than the driven member. If, on the other hand, the driven member is running ahead of the driving member, then the wedging portions will be effective in the reverse order. According to this invention positive means are introduced, whenever desired, to prevent one of the wedging portions from gripping the rollers. The relative movement between the rollers and the surface carrying the wedging portions is limited in one direction by this positive means so that the rollers can assume only a neutral inactive position when the driving forces tend to shift the rollers in one direction. Thus, for example, when the driven member runs ahead of the driving member in a forward direction, the rollers may be carried to the intermediate, ineffective position but will be there arrested by the positive means. The driving member is still free to drive the driven member, however, in the same direction by the shifting of the one active wedging portion of the driving surface into cooperation with the rollers. Provision is also made for disabling the positive means and permitting either wedging portion of the surface to grip the rollers when the members are turning in the reverse direction regardless of which member has a tendency to drive the other.

The means which, under the manual control, may be made to shift the positive means at will and which shifts it automatically during reverse operations to disable the free wheeling action, acts through a relatively small friction force. A much smaller friction force is effective for this purpose than could possibly be utilized as the sole means for maintaining the inactive relation of the rollers to the wedging portions. This frictional control of a positive means for accomplishing the stated function constitutes an important feature of the invention. It affords a simpler, more effective and more reliable control than a solely frictional control. It further provides for very rapid displacement of the free wheeling operation when reversing and rapid enablement of the positive means to permit free wheeling when forward driving is again resumed. The controlling friction force needs to bear no definite relation to the internal friction of the transmission mechanism as would be required if friction alone were relied upon. According to the preferences of the particular requirements, the small frictional forces referred to may be arranged either to produce free wheeling when these forces are active and positive coupling in both directions when they are inactive or vice versa.

Provision is made, in accordance with the present invention, for the application of the free wheeling control directly in connection with the differential mechanism which permits one wheel of a motor vehicle, for example, to turn independently of the other wheel. For this purpose two coupling devices of the type already mentioned may be related one to each of the half axles connected with the driving wheels. Thus two sets of the rollers, or similar devices, may be employed between two sets of coaxial wedging surfaces. The wedging surfaces connected with the common driving member may be made integral and constitute but a single surface having sets of oppositely inclined wedging portions adapted to cooperate with both sets of rollers. A gearless construction is thus provided for producing the differential action between the wheels in rounding corners, for example. To permit the desired independent action of the wheels the wedging rollers of each set are suitably mounted in a cage and the two cages are interconnected in such a way as to permit only a slight relative movement. Thus when one wheel rotates more rapidly than the other, as in rounding a curve, the cage of the more rapidly moving wheel may shift relatively to the other cage to carry its rollers into a central or inactive position with relation to the wedging portions of the driving surface. An advantage of this type of differential is that it provides for the transmission of a large part of the driving force to a wheel having good traction when the other wheel may be slipping. An important feature of the invention is the provision of the free wheeling control, i. e., the mechanism which determines whether or not the driven members will run free independently of the driving member, in conjunction with the gearless form of differential.

A more specific feature of the invention is the provision of improved means for maintaining the roller cages of a differential construction of the type mentioned in proper relation. This means is such that the cages are permitted a slight relative angular movement but are positively prevented from partaking of more than a definitely limited relative movement. The means, furthermore, is so constructed and arranged that the cages will be restored to a definite, normal relation whenever free, the restoring forces being relatively large as the cages approach their normal relation.

As previously stated, the positive means for arresting the rollers in central, inactive position to produce free wheeling may be urged by resilient means either into active of inactive position and may be urged by the friction control means into the opposite position. Inasmuch as free wheeling will normally be desired for the greater portion of the operating time of a car, it will be preferable in applying the invention to a motor vehicle to normally permit free wheeling and to employ the friction control for automatically removing the positive detent, which produces the free wheel action, when the car is operated in reverse. The same friction control may be manually thrown into operation for the purpose of eliminating the free wheeling altogether whenever desired. One suitable form of positive lock which may be employed may be in the form of a ball which is either axially or radially movable by the friction control into a position between one of the roller cages and the driving member for limiting relative movement of these parts in one direction. Other locking devices may readily be employed in lieu of the ball to accomplish the same purpose.

It will be obvious that the differential mechanism may be constructed, if desired, without the manual control so that the free wheeling action will always be available during forward movement of the car but will be eliminated during reverse operations.

In a modified form of the invention the frictional control of the positive locking means may be replaced by a form of electrical control involving, for example, an electromagnet. Under this embodiment of the invention the lock may normally be effective to produce free wheeling but when the braking effect of the engine is desired, the electromagnet may be energized to remove or disable the lock. This energization of the magnet may be brought about through manual control of a switch. Other means operated automatically in response to the reversal of the drive may also be employed for causing the magnet to be energized.

The accompanying drawings illustrate, by way of example only, a number of suitable forms of construction embodying the various features of the invention.

Figure 3 is a transverse section taken substantially along a central plane between the half axles of Figure 2, but with parts broken away.

Figures 5 to 8 are detail sectional views diagrammatically showing the relation between parts under different conditions of operation, portions of each view being taken along a section at right angles to other portions.

Figures 9, 10 and 12 are detailed sectional views relating to a modified form of the invention employing radially movable locking balls.

Figure 11 is a longitudinal sectional view of half of a further modified form of differential having radially movable balls.

Figures 13 and 14 are detail views illustrating different forms of brake bands which may be used in conjunction with mechanisms shown in Figures 9 to 12.

Figures 15 and 16 are, respectively, a longitudinal, sectional view and a side elevation, partly in section and partly broken away, of a modification embodying pivoted locking elements.

Figures 19, 20 and 21 are views illustrating a modified form of the invention in which free wheeling normally obtains but may be eliminated by application of friction through an external band.

Figures 26 and 27 are detail views showing a further modification of a pivoted locking element embodied in a system of the general type illustrated in Figures 19 to 25, and Figure 28 is a detail view showing a still further modification embodying a pivoted locking element in a system of the type shown in Figures 19 to 27.

Figure 1:
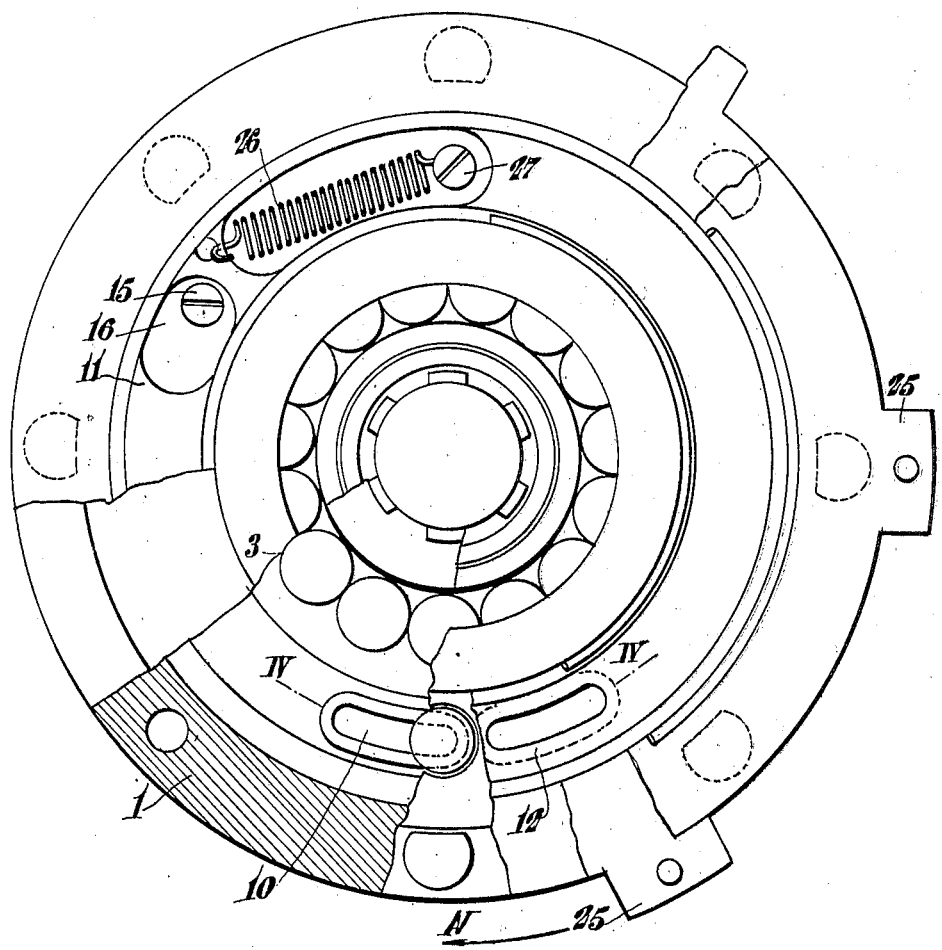
Figure 1 is a side elevation with various parts shown in section and parts broken away illustrating the improved form of differential mechanism embodying an axially movable locking ball controlled by friction, free wheeling being obtained when friction is applied.
Figure 4:
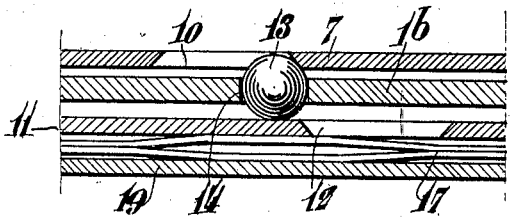
Figure 4 is a sectional view taken on line IV—IV of Figure 1.
Figure 2:
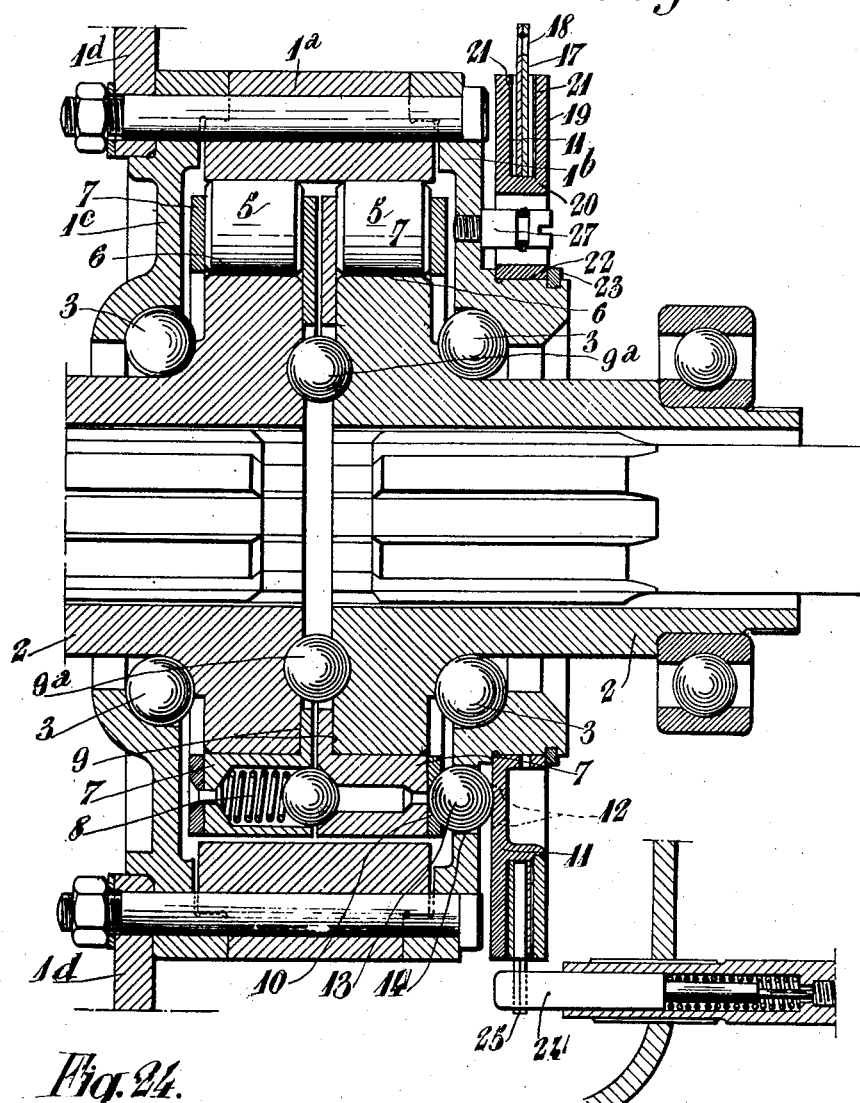
Figure 2 is a vertical longitudinal section through the mechanism of Figure 1, showing the method of mounting the ball locking system and the friction control devices.

The free wheeling differential illustrated in Figures 1 to 9 may comprise the following principal parts:

A casing 1, preferably of the same size as, and being mounted in substantially the same manner as, an ordinary differential gear may be provided. For the sake of simplicity in its manufacture, it is made, preferably as illustrated, in three parts comprising a cylindrical sleeve 1ª of high resistance steel and cheeks 1ᵇ and 1ᶜ. These three parts are bolted together along with the driving crown 1ᵈ, which latter is driven in the usual way by the bevel pinion (or worm) arranged at the end of the longitudinal transmission shaft. The inner cylindrical surface of the sleeve 1ª of the casing is provided with a number of longitudinally extending grooves 4, preferably equidistantly spaced. The grooves are preferably in the form of portions of cylindrical surfaces the generatrices of which are parallel to the axis of the axle.

Each groove constitutes two symmetrical wedging portions having their surfaces inclined in opposite directions. One wedging portion of the groove is used for the actuation of the driven members during forward running and the other for the actuation during movements of the car in reverse as well as in effecting braking through the engine.

It is advantageous that in cross section a groove be a single arc of a circle with, relatively to the axis of the axle, an angular difference of a few degrees, for instance, between the useful wedging surface in one direction. The casing 1 is centered on the driving hubs 2 of the two half-axles by means of two series of balls 3 which cooperate with inclined, grooved shoulders formed on the hubs and on the cheeks 1ᵇ and 1ᶜ, the balls 3 thus serving at the same time as centering and bearing members. This method of properly centering the parts, which constitutes an important feature of the construction, provides means for the purpose which is thus independent of the wedging members or rollers.

Cylindrical rollers 5 are arranged by pairs end for end in the wedging grooves. These rollers are distributed at regular spaced intervals between the surface of the wedging grooves and the cylindrical surfaces 6 of the driven hubs 2.

The radius of the wedging grooves and that of the rollers are such that when the rollers become wedged by shifting to one side or the other of the normal central position to a position between the inclined wedging portions of the grooves and the surfaces of the hubs, the line joining the contacts forms with the normal to the surface at each point of contact an angle appreciably smaller than the friction angle. Under these conditions, the wedged rollers are capable of transmitting any required stress without slipping.

Two cages 7 each maintain, without play, the equidistance of the rollers of each series and are centered on a hub 2. Both cages are rigid in themselves and they are connected by a resilient interlocking arrangement; by virtue of the resilient interconnection one of the cages can receive, relatively to the other, a slight rotation about its axis resilient returning forces being set up at such times to restore the normal relative positions of the cages. This interlocking arrangement is so constructed as to obtain a strong or firm returning action, even in immediate proximity to the normal position of equilibrium of the cages on account of the high initial load in the spring and the fact that only a component of the force tending to turn one cage relative to the other needs to be opposed by the spring. In fact this returning force is nil in the position of equilibrium, but reaches a considerable magnitude upon the least angular deviation of one cage from its normal position relatively to the other. For this purpose use is made of springs 8, which are always under tension, arranged in the body of one of the cages. Taking a bearing at one end on this cage, they exert a thrust on a ball or push-piece which bears on a conical surface, having any suitable generatrix, provided on the other cage. These springs ensure the resilient interlocking as well as the longitudinal spacing apart of the cages. Owing to this latter action, the two inner cheeks of the cages bear along annular surfaces, formed by the flanges 9, against the sides of the hubs 2. This pressure contact tends to cause the cages to be driven by friction, in response to movements of the hubs, thus tending to prevent a relative displacement between these members.

A series of balls $9^a$ serve as a bearing and spacing means between the two hubs 2 between which they are interposed. They prevent any untimely clamping of the cages such as might otherwise be caused by pinching of the flanges 9 and which might create between them an undesirable friction hindering their freedom.

An apparatus constructed in accordance with the foregoing allows the actuation of the hubs and their connected axles by the engine and braking through the engine whenever the hubs have a tendency to overrun either during forward or backward running and, in addition, the differential movement of the wheels in turning corners or the like is permitted by virtue of complete separation of one of them at such times from the driving source. In cases where it is not desired that the car should be capable of progressing with free wheel action, the apparatus may be used in accordance with the arrangement of parts described without the additional devices which will be mentioned hereinafter.

During propulsion, whenever the vehicle makes a turn, the rollers related to the outside wheel, which at this time is moving faster than the driving means, will move away from their wedged position by virtue of the friction on the flanges 9. This movement of one cage relative to the other is permitted by the resilient connection of the cages which at the same time prevents the rollers of the shifted cage from reaching the other inclined wedging portions of the grooves.

When the wheels are urged to rotate more rapidly than the casing, the internal friction of the differential mechanism causes the shifting of the cages with the hubs relative to the driving casing 1 and the wedging of the rollers takes place on the opposite, inclined portions of the grooves which normally become effective during backward running. Braking through the engine is thus obtained; in this case, during a turn, the disengagement from the driving casing takes place with relation to the wheel on the inner side of the turn due to the fact that this wheel and its related cage will be retarded at this time with respect to the other wheel and the driving casing. The rollers connected with this inner wheel will be shifted back into the central, non-wedging position.

During propulsion or braking through the engine any irregularity of the driving reactions or resistances offered by the ground to the wheels acts on the differential devices in such a way as to cause a returning torque to be set up most favorable to the stability of the vehicle and of the steering gear.

When the wheels tend to rotate more rapidly than the casing, if, instead of exerting a braking action, it is desired to maintain the free wheel action, it is necessary that the cages and rollers should be held after a slight movement relative to the casing so that they will be retained in the central, non-wedging position and cannot be carried into the opposite wedging position. For this purpose the cages and rollers might be held directly by an external friction acting on a friction drum, placed outside the casing but connected directly with one of the cages by fingers passing through apertures formed in a cheek of the casing. This system is objectionable in that the external friction must materially exceed the internal forces tending to shift the rollers into engagement with the opposite wedging forces, which forces in themselves must be powerful if a safe operation is desired, with braking through the engine, particularly when the thick oils now in current use are employed. The cages and rollers might also be held alternatively by a controlled positive detent which will stop the cages in a central, inactive position relatively to the casing, thus preventing the rollers from reaching their wedging position normally taken up during backward running. A difficulty encountered in the application of this system is that before being able to pass to backward running, it is necessary to release the detent or abutment, otherwise it would be impossible to place the rollers in wedging relation to drive the car in reverse.

The preferred form of mechanism, contemplated for the purpose by the invention, comprises a combination of the two foregoing systems, the control of the locking and unlocking action of a positive detent being effected by a small external friction, absolutely independent of the internal friction. The arrangement is such that in the first form of the invention when backing with the external friction applied, so as to provide free wheeling during forward running, the mere reversal of the direction of this friction force due to reversing the car serves to automatically release the locking device; the car then can immediately be driven rearwardly with possibility of braking through the engine, which is then very desirable in the maneuvering of the car. In the second form of the invention suggested, in which free wheeling normally obtains but is disabled under the control of the external friction, the latter is automatically set in action in backing to release the normally active locking device to disable the free wheel. The external and internal frictions involved in the improved mechanism having no longer any compulsory relation to each other, it is then possible to increase the internal friction at will, which is a very desirable condition for constant safety of operation. Under these conditions it is moreover possible to use, without danger of misoperation, any thick oil such as is commonly employed for lubricating the live axle, this, for various reasons, providing a considerable practical advantage.

It will be obvious that any of a variety of types of locking devices can be used, within the scope of the invention, provided they are suitably controlled by external friction. In the embodiment illustrated in Figures 1 to 8, in which the friction controls the locking action of a longitudinally movable ball, the outer cheek of the cage, which is on the side opposite to the toothed driving crown, is provided with a tapered port 10. The drum 11, journeled outside of the casing on a portion of the cheek 1ᵇ and adapted to receive the friction, is provided, on its inner face, with a corresponding elongated opening or port 12. A ball 13, the diameter of which is greater than the width of the ports, is seated in a cylindrical opening 14, having the same diameter and formed in the cheek of the casing of the differential mechanism. A section taken on line IV—IV of Figure 4, clearly shows the relative arrangement of these various parts.

The external friction causes a relative displacement of the friction drum with respect to the casing. It is obvious that when the ball enters the port 12 of the friction drum, the locking of the cages relatively to the casing is cancelled, and the rollers can be freely shifted into engagement with either set of the inclined faces of the grooves in the casing to provide a continuous coupling in either forward or backward running of the car. Braking through the engine is possible under these conditions. On the other hand if the ball is forced out of the port 12 and into the port 10, the cages will be limited in their movement in one direction relatively to the casing; the free wheeling operation is then made effective.

The displacements of the friction drum relatively to the casing are limited by a suitable stop. For this purpose the cheek 1ᵇ of the casing carries a screw 15 which extends freely through an elongated aperture 16 in the friction drum. A limited relative movement between the drum and casing in one direction from normal is permitted and the extent of the movement of the screw 15 from one end of the opening to the other. In Figure 1 the parts are shown in their relatively displaced positions.

The external friction members may comprise a friction crown constituted by two thin wavy or corrugated annular members, riveted together near their outer peripheries as indicated, at 18. The double crown member, which is thus formed, has a desirable amount of lateral resilience. It is mounted and frictionally held between the inner face of the friction drum and an outer cheek element 19 secured to the drum for instance by beading, at 20.

Preferably both cheeks of the friction drum are provided on their inner faces with a metal lining 21 which comes into frictional contact at a number of points with the double waved crown, which is made of brass for example. The drum 11 which receives the friction and is equipped in the manner mentioned, is journaled on a bearing 22 provided on the adjacent cheek of the casing and is held against axial movement by a ring or segment 23. A movable finger 24 may be made to hold the double waved crown member 17 stationary by abutting one of a series of lugs 25 extending radially from the periphery of the member.

A returning spring 26, attached, on one hand, to the casing at 27, and, on the other hand, to the friction disc 11, will return this disc as soon as the external friction ceases. This spring is so arranged that its stress is opposed to that of the external friction in the forward movement of the car and will cause release of the locking devices when the friction is suppressed.

The direction of rotation of the differential gear to effect forward movement of the car, may be assumed to be that indicated by the arrow in Figure 1. As here shown the discs 17 have been held by the finger 24, and the casing 1 and drum 11 have shifted relatively to each other thereby stretching the spring 26. If the finger 24 is withdrawn, the external friction will be removed and the discs 17, together with the drum 11 will be restored by the spring 26 to their normal positions with respect to the casing, discs 17 being then simply driven by the drum 11. Under these conditions, the spring 26 which returns the drum 11 will bring the port 12 of this drum opposite the locking ball (Figure 5). The locking action of the ball is thus destroyed as the ball can lock the cage only by abutting against an inclined surface of its port 10. When, however, the ball is free to move, it is simply compelled to enter the port 12 and therefore to leave entire freedom to the cages to move relatively to the casing. In the forward and backward movements of the car it is then driven with the possibility of obtaining braking through the engine and without the possibility of free wheeling.

Figure 6:
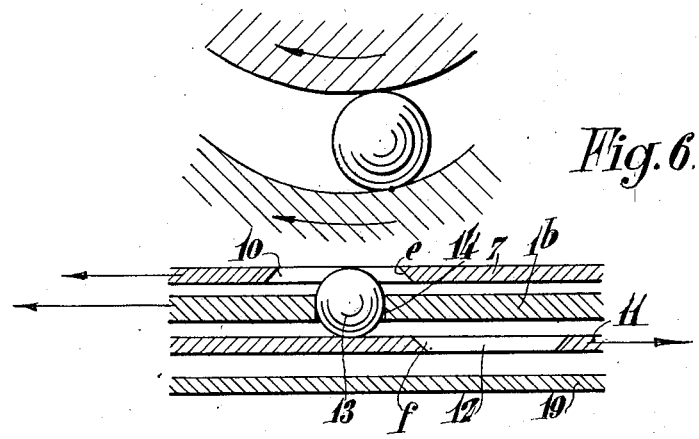

Let it now be assumed that the external friction is caused to act, by stopping of the double inner crown 17 by the finger 24. This friction overcoming the resilient returning action of the spring 26, the port 12 of the locking device will tend to move relatively to the casing in a direction reverse to that of the rotation of the latter (Figure 6). Several cases must be considered, in order to understand how the locking action takes place under all conditions.

1. Assume that the car is being propelled at the time the finger 24 is pushed in to exert the frictional control.

Figure 7:
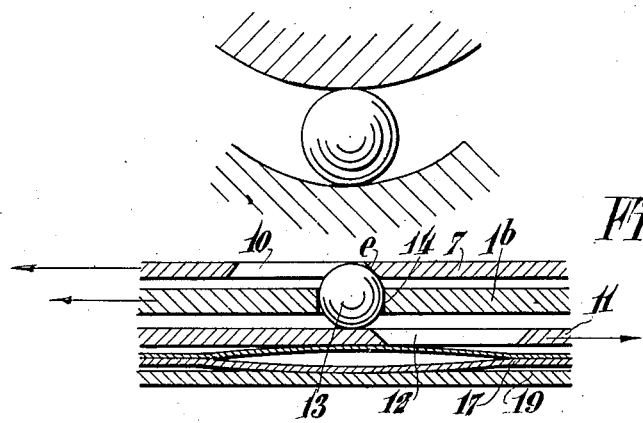

The rollers 5 would then have been in contact with the wedging surfaces of the grooves which are effective for forward running (Figure 6). From that part of the figure which represents a development of the section IV—IV of Figure 1 it will be seen that the port 10 of the cage is in its extreme right-hand position relatively to the casing. The port 10 is so located at this time that the locking ball can freely enter it, it being urged to do this, as soon as the external friction is produced, by the sloping edge of the port 12. The ball then immediately enters the port 10 and assumes the position shown in the diagram of Figure 6, and the desired locking action is made effective. If, in fact, the wheels tend to progress more rapidly than the driving members, the hubs on the half-axles will carry the cage (and consequently the port 10) in the forward running direction, as indicated by the arrow, until the rear edge of the port abuts against the ball (Figure 7). The car will then move along with free wheel action, since the rollers 5 will be held in their central, inactive position.

2. Assume that the car is being braked through the engine at the time the control is exerted.

Figure 8:
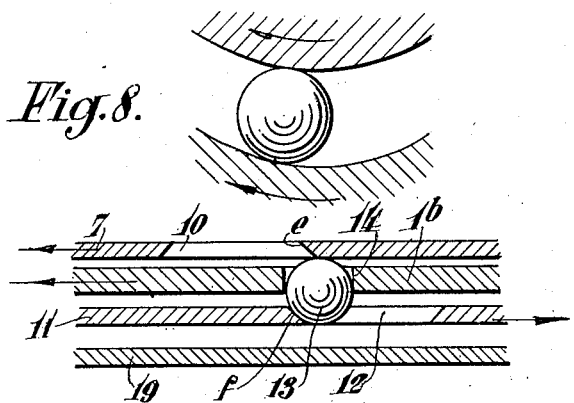

When the braking action is being exerted through the engine, the port 10 will assume the position indicated in Figure 8 relative to the casing and the passage of the ball will be prevented. Before the external friction is exerted, the various locking members will be in the respective positions indicated in Figure 5. After it has been exerted, the ball will be engaged and urged toward the cage by the bevelled surface of the port of the friction disc, but it cannot enter the port 10 of the cage (Figure 8). However, as soon as the forward driving is resumed so that the casing tends to drive the hubs, the port 10 will come opposite the locking ball and permit the latter to enter (Figure 6.) The car can then move with free wheel action as before (Figure 7).

When the external friction is relieved, the spring 26 returns the friction drums and the port 12 will be brought opposite the ball. The latter will then be forced to enter this port as soon as the wheels tend to progress in advance of the driving members, as the cage, through the beveled surface e of its port 10, will push the ball into the other port with a force proportionate to the internal friction between the hubs and the cages (Figure 5).

If the car is reversed while the external friction is applied the direction of the latter will be changed as soon as one of the projections 25 engage the opposite side of the finger 24. The frictional force thus set up is then added to the resilient returning action of the spring 26 so that even if the spring should fail to properly function at this time the free wheel action would be disabled since under these conditions the port 12 of the friction drum would be brought opposite the locking ball. When passing to a reverse operation the bevel e of the port 10, by pushing the ball, causes it to enter the port 12 so that the parts will be in the position indicated in Figure 5. When passing again to forward operation of the car, the external friction will take its original direction thereby causing relative movement of the drum and casing and ensuring again free wheeling action. It will thus be seen that in reverse operations, there is always, a positive connection between the driving member and the wheels, even though, in forward movements, free wheeling action is adapted to take place, and this is insured without any other operation than the mere, ordinary reversal of the direction of operation.

In the form of the invention illustrated in Figures 9 to 12, a ball locking device is provided which is similarly subjected to the frictional control action, but in this case, the displacement of the ball takes place radially instead of axially. An advantage of this arrangement is that it does not give rise to any axial thrust or side stress on the locking drum which controls the displacement of the ball.

In the form shown in Figures 9, 10 and 12 the friction disc 30 has a flange 31 provided with ports 32, similar to the ports 12 of the preceding example. The casing 33 is provided with radial holes 34 housing and permitting the movement of balls 35. At the same time the casing is provided with an annular recess 36, into which fits a flange 37 of the cage 38. This flange may be provided with ports 39 corresponding to the ports 10 of the preceding example.

It is not believed necessary to give again in this case an explanation of the general operation of the apparatus, which is in principle the same as for the form of the invention described previously. While the friction means illustrated differs from the first form it effects its control in the same way the frictional contact being made on the periphery of the drum instead of on the side.

In the example of Figure 11 are to be found elements similar to those in Figures 9 and 10; but, in this case, the balls 35 are retained within holes formed in a collar 40 which is caused to move with the cage 38 by means of a finger 41 passing through an elongated opening 42 in the cheek of the casing 37. The casing is then provided at 43 with ports or grooves which play the same part as the ports 39 of the preceding modification; there is simply here an inversion of the locking members, the locking drum 30 which receives the friction being journaled on a part connected directly with the cage instead of on the casing and the locking ball being retained by the cage instead of the casing. An advantage of this arrangement is that there is no longer an undesirable friction between the drum and the casing; the friction developed between the drum and the cage in this case, when the locking action is made effective, facilitates the desired retention of the cage against the forces which tend to shift it as the wheels run ahead of the driving member.

It is to be noted that the ball locking system common to all of the foregoing embodiments constitutes an important feature of the invention, as well as the provision of a friction or braking action by means of a stationary disc or segment. In lieu of the means described with reference to Figures 1 to 9, it is possible to use a friction band such as shown in Figure 13, or better, that of Figure 14, which has several notches for the generation of the external friction. In this way, when the direction of running is reversed, the friction is immediately inverted.

It is preferable that the stop finger for the friction disc or segment should arrest the latter in either direction of movement, without necessitating a complete revolution of the disc to cause a reversal of the frictional force to take place. In this way when the car is thrown into reverse the friction force set up is immediately added to the returning action of the spring without necessitating a complete revolution of the parts to insure the suppression of the free wheeling action and allow the reverse driving action. The suppression of free wheeling is thus a more certain and rapid one.

In the embodiment of Figures 15 and 16, the locking, under the control of friction, is effected by a rocking lever. For this purpose, the cage which is arranged on the side of the differential opposite to the driving crown gear, carries a flat finger 40, which extends through a port in the cheek of the casing. In forward movements of the car when the wheels are driven, this finger moves to the right, and in backward movements of the car the finger moves to the left of the central position indicated, with reference to the port in the casing. A rocking lever 41, which is pivotally mounted on the face of the casing, can be made to abut against the finger 40 in its central position, thus preventing it from moving to its position for reverse movements of the car which is also that of braking through the engine. When the lever is positioned in the path of finger 40 the braking through the engine is rendered impossible and during movements of the car, in the forward direction it can progress with free wheeling action. When the free wheeling action is effective, the finger 40 exerts, on the lever 41, a pressure corresponding to the internal friction of the cages on the hubs. For this reason it is desirable that the direction of this pressure should pass as nearly as possible through the axis of rotation of the rocking lever so as to obtain a real locking action.

When, however, the lever is rocked, it releases the finger 40, so that its displacement becomes entirely free and the braking through the engine is made possible, while the free wheeling action is eliminated. The movement of the rocking lever 41 into and out of engagement with the finger is determined by an external friction which may be applied to a friction ring mounted on a fixed part of the casing. For this purpose, a continuous annular member or ring 42 co-axial with the axle, is rotatably mounted on an extension of the casing and is provided with a notch or opening 46 into which enters a projection 47 carried by the rocking lever. It is desirable to have only a ring for controlling the lever, instead of a complete drum since, when thick oil is employed this avoids the prejudicial effects of viscosity of the oil between a relatively large face of the drum and that of the casing. The external friction may, for example, be created by a friction shoe 48 which is pressed by a spring 49 against the outer surface of the ring 42. A hand control may serve to permit the compression of the spring 49 so as to eliminate the friction by moving the shoe away from the ring. A spring 50, connected between the ring 42 and the face of the casing, returns the ring, consequently releasing the lever 41 as soon as the external friction is eliminated. A stop is provided on the ring at 51 for limiting the movement of the ring relative to the casing and, consequently, that of the finger 40. As a modification of this form of the invention, the friction may be furnished by a second ring mounted on the first one with a predetermined frictional pressure adjustable if need be, this second ring being stopped by a movable abutment whenever it is desired to obtain the friction, in the manner indicated in the preceding examples.

The apparatus being arranged as indicated in Figure 16 rotation of the parts during forward movement of the car takes place in the direction of the arrow at the left of the figure. If the external friction is caused to act, the ring 42 is subjected to a retarding stress which causes the lever to rock into the position shown, in the path of the finger 40. This position is immediately taken by the lever if the car was being propelled or was at rest at the time the friction was applied. If the car was coasting and being braked through the engine, however, the dimensions of the finger 40 are such that, under these conditions, the lever 41 will abut against the outer face of the finger 40. It then immediately comes into locking position when, by a slight acceleration of the engine for instance, the finger 40 is shifted counter clockwise into the position for forward running.

If now the external friction is withdrawn, the spring 50 returns the ring which, by causing the lever to rock, releases the finger 40 to eliminate free wheeling. Upon reversing the driving connections following a free wheeling condition of the parts, the direction of the external friction changes and this friction adds its action to that of the spring 50 for immediately releasing the finger 40. The actuation of the car in reverse is thus made possible immediately with the possibility of braking through the engine, which is an advantageous condition for all backing maneuvres. As soon as forward movement is resumed, the driver has again the possibility of progressing with free wheeling action.

Figure 18:
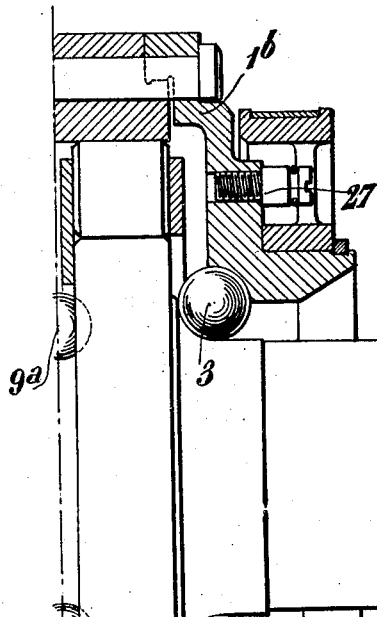
Figures 17 and 18 are a side elevation, partly broken away, and a vertical, longitudinal section, respectively, of a portion of a further modification employing pivoted locking elements.
Figure 25:
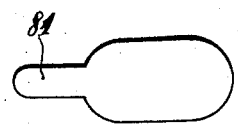
Figure 17:
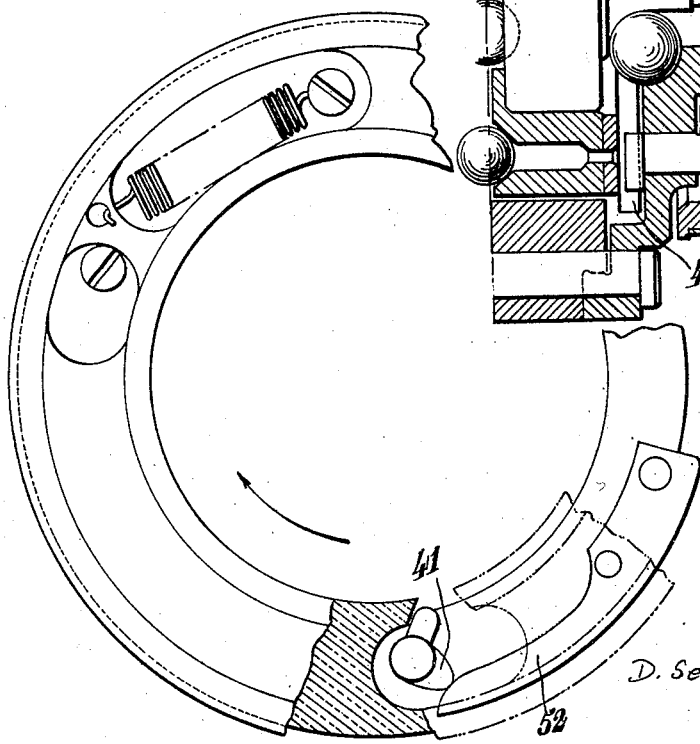

In the example illustrated in Figures 17 and 18, the operation is identical with that just explained but the lever 41 in this case acts within the casing in cooperation with a cam surface 52 connected with the cage. The friction-receiving disc which controls the rocking of the lever is centered on the casing by means of a suitable bearing. The operation is the same as previously explained.

The modifications illustrated in Figures 19 to 28 are of the type in which the external friction is not used for locking the cages and obtaining the free wheeling operation but, on the contrary, is used for unlocking the cages and obtaining the braking effect of the engine.

In Figures 19 to 21 there is shown a ball locking device used in conjunction with this reversed order of operation, braking or external friction being produced through a band having one end fixed and the other end movable. The friction-receiving disc 51 is journaled on a hub extension 52 of the driving casing and is connected with the latter through two duplicate springs 53$^a$ and 53$^b$, acting in reverse directions, so that the disc 51 is capable of rotating on the hub 52 in either direction to a limited extent and is resiliently returned to its normal, central position upon being released. Two stops or abutments (not shown in the drawings) limit the displacement on either side of the central position. As a modification, this bilateral, resilient, returning action may be obtained by the engagement of a ball resiliently pressed against a symmetrical double inclined camming surface provided on the disc, after the manner of the ball of Figure 2 which maintains the cages in a definite relation under the force of spring 8.

The side wall of the disc is provided with two tapered openings 54 and 55, spaced slightly and arranged side by side, with their major diameters facing towards the differential gear. Adjacent these openings there is provided a ball which is held in a cylindrical passage-way 57 formed in the casing 52. On the opposite side of the casing 52 the ball cooperates with a port 58, in the wall of cage 59, having tapered end surfaces sloping in the opposite direction from the walls of the openings 54 and 55.

When no external friction is applied to the disc 51, the ball is located between the two ports 54 and 55, of the disc, the latter being in its central position illustrated in Figure 21. This is the position in which free wheeling may take place during forward running. As soon as the wheels tend to drive the engine, the cage 59 moves relatively to the casing 52 in the direction of its rotation (to the left in Figure 21); it then abuts at 60 against the ball and cannot pass over to the position in which braking through the engine would take place.

The friction is obtained by means of a band 61 having one end attached to a fixed pin or stud 62, and its other end attached to a pin 63 carried by an arm which is held against the action of a spring 64 when no braking action is desired. The car will then run forwardly with the possibility of a free wheeling action; if it is desired to pass over from this condition to running backwardly, the band will automatically wind up on the drum or disc and produce friction. The outer disc will then shift relative to the casing until the port 55 comes opposite the ball 56 which then immediately enters the port, being pushed by the pressure exerted at 60 by the cage 59. The stops provided in conjunction with the disc prevent it from rotating more than necessary for causing the ports 54 or 55 to come opposite the ball.

In a similar way, if during forward movement of the car, a friction is exerted by permitting the spring 64 to act to apply the band, the other port 54 of the disc will be brought opposite the ball 56 and cause the unlocking action. The parts are then in position for braking through the engine, but this time for forward movement of the car. It is obvious that the displacement of the ball instead of being axial in this form of the invention may be radial as in the forms shown in Figures 9 to 12 inclusive.

Figure 22:
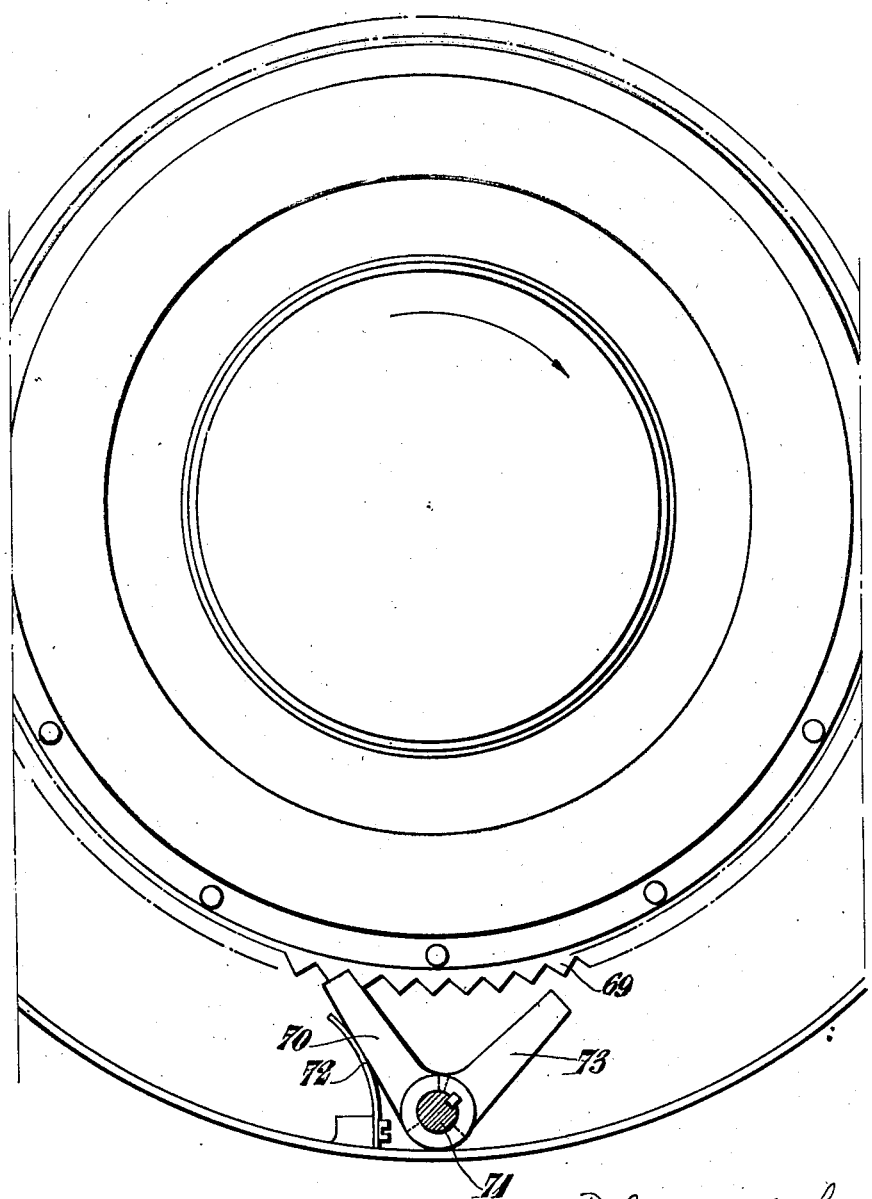
Figures 22 and 23 are detail views illustrating a further modification in which external friction may be applied to eliminate a normal free wheeling condition.
Figure 23:
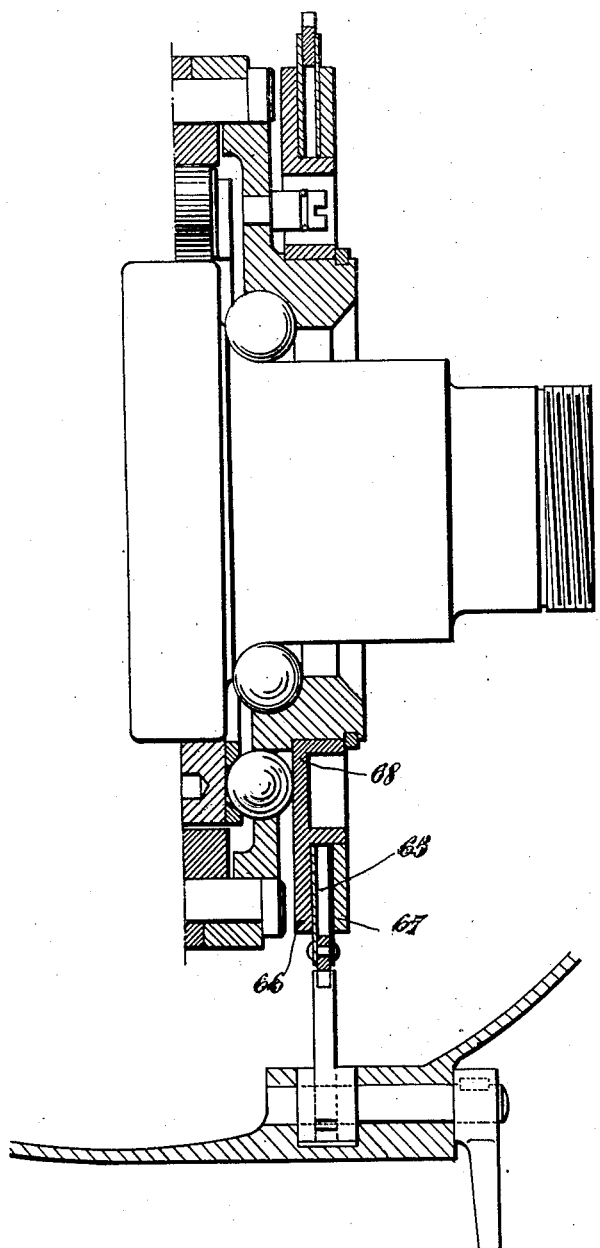

Figures 22 and 23 illustrate a construction having the same locking arrangement as in Figures 19 to 21 but the friction is obtained by means of a crown 65 clamped between two cheeks 66 and 67 of the disc 68 which is provided on its periphery with teeth 69. A pawl 70 is loosely mounted on its pivot 71 and is urged into a simple resilient contact with the teeth 69 by the spring 72. This pawl serves to stop the crown during backward running of the casing so as to set up a friction on the disc 68 but the pawl does not interfere with the forward rotation of the disc. A second pawl 73, operated by a mechanical or electromagnetic control may be provided to stop this crown at will during forward running. It is obvious that suitable wedging devices might be substituted for one of the pawls or both.

Figure 24:
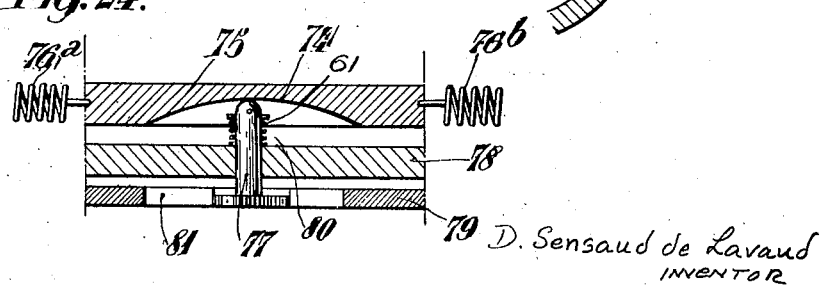
Figures 24 and 25 are detail views showing a modified form of positive lock which may be frictionally controlled to eliminate free wheeling.

Figure 24 illustrates a similar form of locking device, but one in which a single groove 74 provided with symmetrical, oppositely inclined surfaces is formed in the friction disc 75 which is centralized or returned, as in the previous form, by two springs 76ª and 76ᵇ. A plunger or push-piece 77, which replaces the ball of the other form, slides in the casing 78 and has its head in the plane of and extending into an opening in the cage 79 when it cooperates with the midpoint of the groove in the disc. A wire or leaf spring 61, arranged between a pin or shoulder on the push-piece and the casing, always tends to shift the push-piece into the locking position indicated in Figure 24. It will be seen that in either direction of its displacement from the position shown, the disc 75 will cause the plunger to shift and effect unlocking of the cage, thereby permitting braking through the engine. The extreme positions of the disc may be limited by stops on the casing or more simply by the push-piece which may be so arranged that it can not be shifted completely out of the groove 74. A port 81 (Figure 25) which is a narrowed extension of the opening in the cage 79 allows the required full movement of the cage to enable reversing, etc., when the push piece is shifted.

The port 81 is adapted to slide over the shank of the push-piece when the latter is shifted but when it is in the position shown the head will prevent movement of the cage far enough to produce braking by the engine. A free wheeling condition therefore will normally exist but may be eliminated upon the application of friction to the disc 75 in any of the ways discussed.

Figure 27:
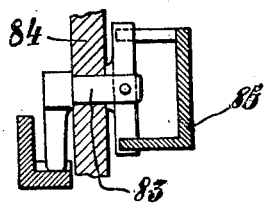

The device shown in Figures 26 and 27 will produce the same type of operation as the mechanisms of Figures 19 to 25 but it constitutes a different form of locking arrangement involving the use of a rocking lever 82 pivoted at 83 on the casing 84. The lever 82, on the side of the casing facing the disc 85 carries two arms 82ª and 82ᵇ so that when the disc 85 shifts in one direction, due to the application of friction, it presses at 86 on one of the arms, and when it shifts in the other direction, it presses on the other arm at 87. In both cases the disc 85 controls the rocking of the lever to release the cage for full movement in the reverse driving direction. A spring 88 always returns the lever relatively to the casing into its position in the path of the projection on the side of the cage and consequently into the free wheeling position.

Figure 28 illustrates a similar locking device involving a locking lever 89 controlled by a single groove 90 in the disc 91 having symmetrically inclined surfaces. The profile of this groove is such that the lever is rocked to release the cage in either direction of movement of the disc 91 thus ensuring the elimination of the free wheeling action upon application of friction to the disc in any of the ways previously discussed. A spring 92, arranged between the lever and the casing, always tends to hold the lever in the locking position indicated.

The illustrative examples of means for carrying out the features of the invention which have been described, are obviously capable of various modifications which can be made without departing from the spirit and scope of the invention. Thus the wedging surfaces and the rollers of the cages may be of any other suitable construction capable of producing the desired wedging action between the inner and outer sleeves. Likewise, the resilient connection between the two cages of the rollers may be modified and the braking and locking means may be of any shape and arrangement suited to the object in view.

What I claim as my invention and desire to secure by Letters Patent is:—

1. Power transmission mechanism comprising a driving member, a driven member, wedging elements adapted to be wedged between surfaces on said members to effect a driving connection between the same in either direction, and means for preventing said elements from assuming a wedging relation with respect to said members when the driven member tends to rotate more rapidly than the driving member in one direction thereby permitting said driven member to rotate freely of said driving member, said means comprising an abutment associated with said elements, a movable abutment associated with one of said members adapted to cooperate with said first abutment, and friction means for controlling said movable abutment.

2. Power transmission mechanism comprising a driving member, a driven member coaxial with said driving member, wedging elements adapted to be wedged between surfaces on said members to effect a driving connection between the same in either direction, devices independent of said elements for maintaining the coaxial relation between said members, and means for preventing said elements from assuming a wedging relation with respect to said members when the driven member tends to rotate more rapidly than the driving member in one direction thereby permitting said driven member to rotate freely of said driving member, said means comprising an abutment associated with said elements, a movable abutment associated with one of said members adapted to cooperate with said first abutment, and friction means for controlling said movable abutment.

3. Power transmission mechanism comprising a driving member, a driven member, one of said members having wedging surfaces inclined in opposite directions toward the surface of the other member, wedging elements having exterior surfaces of revolution interposed between said members and adapted when left free to effect a driving connection between said members in either direction, and means for preventing said elements from assuming a wedging relation with respect to said members when the driven member rotates more rapidly than the driving member in one direction, thereby permitting said driven member to rotate freely of said driving member, said means comprising an abutment and a movable abutment adapted to cooperate therewith, one of said abutments being associated with said elements and the other with one of said members, and friction means for controlling the movement of said movable abutment into and out of the path of the first abutment.

4. Power transmission mechanism comprising a driving member, a driven member, wedging elements adapted to be wedged between surfaces on said members to effect a driving connection between the same in either direction, a cage adapted to maintain a definite spaced relationship between said elements, and means for preventing said elements from assuming a wedging relation with respect to said members when the driven member tends to rotate more rapidly than the driving member in one direction thereby permitting said driven member to rotate freely of said driving member, said means comprising an abutment, a movable abutment adapted to cooperate therewith, one of said abutments being associated with said cage and the other being associated with one of said members, and friction means for controlling said movable abutment.

5. In a device of the class described a driving member, two driven members, wedging elements interposed between the driving member and each driven member and adapted to be wedged between surfaces of said members to effect driving of the driven members in either direction when the wedging elements are left free, and means for preventing said elements from assuming a wedging relation with respect to said members when the driven members rotate more rapidly than the driving member in one direction, thereby permitting free rotation of said driven members, said means comprising an abutment, a movable abutment adapted to cooperate therewith, one of said abutments being associated with said elements and the other being associated with one of said members, and friction means for controlling said movable abutment.

6. In a device of the class described a driving member, two driven members, wedging elements interposed between the driving member and each driven member and adapted to be wedged between surfaces of said members to effect driving of the driven members in either direction when the wedging elements are left free, a cage associated with each driven member for maintaining a spaced relation between the associated wedging elements, and means for preventing said elements from assuming a wedging relation with respect to said members when the driven members rotate more rapidly than the driving member in one direction, thereby permitting free rotation of said driven members, said means comprising an abutment, a movable abutment adapted to cooperate therewith, one of said abutments being associated with said cages and the other being associated with one of said members, and friction means for controlling said movable abutment.

7. In a device of the class described a driving member, two driven members, wedging elements interposed between the driving member and each driven member and adapted to be wedged between surfaces of said members to effect driving of the driven members in either direction when the wedging elements are left free, a cage associated with each driven member for maintaining a spaced relation between the associated wedging elements, resilient connections between said cages for urging the same into a definite normal relation, and means for preventing said elements from assuming a wedging relation with respect to said members when the driven members rotate more rapidly than the driving member in one direction, thereby permitting free rotation of said driven members, said means comprising an abutment, a movable abutment adapted to cooperate therewith, one of said abutments being associated with one of said cages and the other being associated with one of said members, and friction means for controlling said movable abutment.

8. In a device of the class described a driving member, two driven members, wedging elements interposed between the driving member and each driven member and adapted to be wedged between surfaces of said members to effect driving of the driven members in either direction when the wedging elements are left free, a cage associated with each driven member for maintaining a spaced relation between the associated wedging elements, resilient connections between said cages for urging the same into a definite normal relation, said connections comprising a spring under initial stress, and means for preventing said elements from assuming a wedging relation with respect to said members when the driven members rotate more rapidly than the driving member in one direction, thereby permitting free rotation of said driven members, said means comprising an abutment, a movable abutment adapted to cooperate therewith, one of said abutments being associated with one of said cages and the other being associated with one of said members, and friction means for controlling said movable abutment.

9. In a device of the class described a driving member, two driven members, wedging elements interposed between the driving member and each driven member and adapted to be wedged between surfaces of said members to effect driving of the driven members in either direction when the wedging elements are left free, a cage associated with each driven member for maintaining a spaced relation between the associated wedging elements, resilient connections between said cages for urging the same into a definite normal relation, said connections comprising a spring carried by a recess in one cage, and a push-piece mounted in said recess and urged by said spring into a recess having tapered sides formed in the other cage, and means for preventing said elements for assuming a wedging relation with respect to said members when the driven members rotate more rapidly than the driving member in one direction, thereby permitting free rotation of said driven members, said means comprising an abutment, a movable abutment adapted to cooperate therewith, one of said abutments being associated with one of said cages and the other being associated with one of said members, and friction means for controlling said movable abutment.

10. In a device of the class described a driving member, two driven members, wedging elements interposed between the driving member and each driven member and adapted to be wedged between surfaces of said members to effect driving of the driven members in either direction when the wedging elements are left free, a cage associated with each driven member for maintaining a spaced relation between the associated wedging elements, resilient connections between said cages for urging the same into a definite normal relation, said connections comprising a spring carried by a recess in one cage and a ball mounted in said recess and urged by said spring into a recess having tapered sides formed in the other cage, and means for preventing said elements from assuming a wedging relation with respect to said members when the driven members rotate more rapidly than the driving member in one direction, thereby permitting free rotation of said driven members, said means comprising an abutment, a movable abutment adapted to cooperate therewith, one of said abutments being associated with one of said cages and the other being associated with one of said members, and friction means for controlling said movable abutment.

11. In a device of the class described a driving member, two driven members, wedging elements interposed between the driving member and each driven member and adapted to be wedged between surfaces of said members to effect driving of the driven members in either direction when the wedging elements are left free, a cage associated with each driven member for maintaining a spaced relation between the associated wedging elements, resilient connections between said cages for urging the same into a definite normal relation, said connections comprising a spring carried by a recess in one cage, and a push-piece mounted in said recess and urged by said spring into a recess having tapered sides formed in the other cage, said cages having radially extending flanges in engagement with radial surfaces on said driven members, and means for preventing said elements from assuming a wedging relation with respect to said members when the driven members rotate more rapidly than the driving member in one direction, thereby permitting free rotation of said driven members, said means comprising an abutment, a movable abutment adapted to cooperate therewith, one of said abutments being associated with one of said cages and the other being associated with one of said members, and friction means for controlling said movable abutment.

12. In a device of the class described a driving crown comprising a cylindrical socket member having a plane side, a side cheek secured to said plane side and wedging surfaces formed on the interior of said socket, two driven members, wedging elements adapted to be wedged between said wedging surfaces and each of said driven members to effect a driving connection between said crown and driven members in either direction, and means for preventing said elements from assuming a wedging relation with respect to said surfaces when the driven members tend to rotate more rapidly than the crown, said means comprising positive detents, and friction means for controlling said detents.

13. In a device of the class described a driving crown comprising a cylindrical socket member having a plane side, a side cheek secured to said plane side and wedging surfaces formed on the interior of said socket, two driven members, bearing means for maintaining said crown properly centered with relation to said driven members, wedging elements adapted to be wedged between said wedging surfaces and each of said driven members to effect a driving connection between said crown and driven members in either direction, and means for preventing said elements from assuming a wedging relation with respect to said surfaces when the driven members tend to rotate more rapidly than the crown, said means comprising positive detents, and friction means for controlling said detents.

14. In a device of the class described a driving member, two driven members, wedging elements interposed between the driving member and each driven member and adapted to be wedged between surfaces of said members to effect driving of the driven members in either direction when the wedging elements are left free, bearing means between said driven members adapted to maintain the same in spaced relation, and means for preventing said elements from assuming a wedging relation with respect to said members when the driven members rotate more rapidly than the driving member in one direction, thereby permitting free rotation of said driven members, said means comprising an abutment, a movable abutment adapted to cooperate therewith, one of said abutments being associated with said elements and the other being associated with one of said members, and friction means for controlling said movable abutment.

15. Power transmission mechanism according to claim 1 in which the driving member comprises a crown having grooves therein each constituting a portion of a cylinder providing inclined wedging surfaces, said grooves being of such dimension as to permit limited movement of the associated wedging elements.

16. Power transmission mechanism comprising a driving member, a driven member, wedging elements adapted to be wedged between surfaces on said members to effect a driving connection between the same in either direction, a cage adapted to maintain a definite spaced relationship between said elements, a friction coupling between said cage and the driven member, and means for preventing said elements from assuming a wedging relation with respect to said members when the driven member tends to rotate more rapidly than the driving member in one direction thereby permitting said driven member to rotate freely of said driving member, said means comprising a positive detent and friction means for controlling said detent.

17. Power transmission mechanism comprising a driving member, a driven member, wedging elements adapted to be wedged between surfaces on said members to effect a driving connection between the same in either direction, a cage adapted to maintain a definite spaced relationship between said elements, a friction coupling between said cage and the driven member, and means for preventing said elements from assuming a wedging relation with respect to said members when the driven member tends to rotate more rapidly than the driving member in one direction thereby permitting said driven member to rotate freely of said driving member, said means comprising a ball carried within an opening in said driving member, and adapted at times to enter a port formed in the cage, and friction means for controlling the displacement of said ball.

18. Power transmission mechanism comprising a driving member, a driven member, wedging elements adapted to be wedged between surfaces on said members to effect a driving connection between the same in either direction, a cage adapted to maintain a definite spaced relationship between said elements, a friction coupling between said cage and the driven member, and means for preventing said elements from assuming a wedging relation with respect to said members when the driven member tends to rotate more rapidly than the driving member in one direction thereby permitting said driven member to rotate freely of said driving member, said means comprising a ball carried within an opening in said driving member, and adapted at times to enter a port formed in the cage, an element connected with the driving member but shiftable relative thereto, said element having a port adapted to receive said ball, and friction means cooperating with said element to control the shifting thereof relative to said driving member, thereby controlling the position of said ball.

19. Power transmission mechanism comprising a driving member, a driven member, wedging elements adapted to be wedged between surfaces on said members to effect a driving connection between the same in either direction, a cage adapted to maintain a definite spaced relationship between said elements, a friction coupling between said cage and the driven member, and means for preventing said elements from assuming a wedging relation with respect to said members when the driven member tends to rotate more rapidly than the driving member in one direction thereby permitting said driven member to rotate freely of said driving member, said means comprising a ball carried within an opening in said driving member, and adapted at times to enter a port formed in the cage, an element connected with the driving member but shiftable relative thereto, said element having a port adapted to receive said ball, a friction member frictionally connected with said element, and means for arresting said friction member to set up frictional resistance against said element, thereby controlling the shifting thereof relative to said driving member to determine the position of said ball.

20. Power transmission mechanism comprising a driving member, a driven member, wedging elements adapted to be wedged between surfaces on said members to effect a driving connection between the same in either direction, a cage adapted to maintain a definite spaced relationship between said elements, a friction coupling between said cage and the driven member, and means for preventing said elements from assuming a wedging relation with respect to said members when the driven member tends to rotate more rapidly than the driving member in one direction thereby permitting said driven member to rotate freely of said driving member, said means comprising a ball carried within an opening in said driving member, and adapted at times to enter a port formed in the cage, an element connected with the driving member but shiftable relative thereto, said element having a port adapted to receive said ball, friction means cooperating with said element to control the shifting thereof relative to said driving member, thereby controlling the position of said ball and resilient means for returning said element relative to said driving member when the friction is released.

21. Power transmission mechanism comprising a driving member, a driven member, wedging elements adapted to be wedged between surfaces on said members to effect a driving connection between the same in either direction, a cage adapted to maintain a definite spaced relationship between said elements, a friction coupling between said cage and the driven member, and means for preventing said elements from assuming a wedging relation with respect to said members when the driven member tends to rotate more rapidly than the driving member in one direction thereby permitting said driven member to rotate freely of said driving member, said means comprising a ball carried within an opening in said driving member, and adapted at times to enter a port formed in the cage, an element connected with the driving member but shiftable relative thereto, said element having a port adapted to receive said ball, friction means cooperating with said element to control the shifting thereof relative to said driving member, thereby controlling the position of said ball, resilient means for returning said element relative to said driving member when the friction is released and means for limiting the return movement of said element by said resilient means.

22. Power transmission mechanism comprising a driving member, a driven member, wedging elements adapted to be wedged between surfaces on said members to effect a driving connection between the same in either direction, a cage adapted to maintain a definite spaced relationship between said elements, a friction coupling between said cage and the driven member, and means for preventing said elements from assuming a wedging relation with respect to said members when the driven member tends to rotate more rapidly than the driving member in one direction thereby permitting said driven member to rotate freely of said driving member, said means comprising a ball carried within an opening in said driving member, and adapted at times to enter a port formed in the cage, an element connected with the driving member but shiftable relative thereto, said element having a port adapted to receive said ball, friction means cooperating with said element to control the shifting thereof relative to said driving member, thereby controlling the position of said ball, and resilient means for returning said element relative to said driving member when the friction is released, said element having a notch to receive said ball when the element is shifted thereby preventing its return by said resilient means until said driven member and said cage shift relative to said driving member.

23. In a device of the class described a driving member, a driven member, said members having opposed surfaces with oppositely inclined wedging portions, wedging elements adapted to be shifted against certain of said portions when the driving member tends to rotate in one direction relative to the driven member and to be shifted against other of said portions when the driving member tends to rotate in the opposite direction relative to the driven member, said elements when left free serving to effect a driving connection between said members for rotation in either direction, a positive detent for preventing said elements from engaging certain of said wedging portions, thereby permitting free rotation of the driven member and friction means for disabling said positive detent, said friction means being rendered automatically effective for disabling said detent upon rotation of said driven member in one direction.

24. In a device of the class described a driving member, a driven member, said members having relatively inclined wedging surfaces, wedging elements adapted to be shifted relatively to said surfaces to effect a driving relation between said members when either tends to rotate relatively to the other in either direction, and means operable at will for limiting the shifting of said elements relative to said surfaces to permit free rotation of one of said members relative to the other, said means comprising a positive stop and friction means for controlling said stop, said friction means being automatically controlled upon rotation of said driving member in one direction for disabling said first mentioned means.

25. In a device of the class described a driving member, a driven member, said members having relatively inclined wedging surfaces, wedging elements adapted to be shifted relatively to said surfaces to effect a driving relation between said members when either tends to rotate relatively to the other in either direction, a movable detent adapted to limit the shifting of said elements relative to said surfaces to permit free rotation of one of said members relative to the other, a device resiliently connected with one of said members for determining the position of said detent, said device being shiftable in either direction from a normal position relative to said member, means for urging said device into said normal position, friction means for controlling the shifting of said device relative to said member, and means operable at will for causing said frictional means to control shifting of said device in one direction relative to said member, said device being automatically shifted in the opposite direction relative to said member upon rotation of said member in one direction.

26. In a device of the class described a driving member, a driven member, said members having relatively inclined wedging surfaces, wedging elements adapted to be shifted relatively to said surfaces to effect a driving relation between said members when either tends to rotate relatively to the other in either direction, a cage shiftable with said elements and adapted to maintain a definite spacing thereof, an annular member rigidly connected with said cage and disposed concentrically with respect to a portion of said driving member, a friction ring disposed concentrically with respect to said annular member, said ring being resiliently connected with said driving member and having a limited movement relative thereto, a push-piece movable radially with respect to said annular member, ring and concentric portion of the driving member, said push-piece being controlled by said ring and adapted to limit the shifting of said cage relative to the driving member to partially disable the driving connection between the driving and driven members and means for applying friction to said ring to cause it to shift relative to said driving member and determine the position of said push-piece.

27. In a device of the class described a driving member, a driven member, a two way clutch for connecting said members, positive means for partially disabling said clutch to permit the driven member to overrun the driving member in one direction of rotation, and friction controlled means operable at will for controlling said positive means, said friction controlled means being automatically operated upon rotation of said driving means in the reverse direction to render said positive means inactive.

28. In a device of the class described a driving member, a pair of driven members, means providing a two-way connection between said driving member and each of said driven members, positive means cooperating with said first mentioned means for partially disabling said connection to permit said driven members to overrun said driving member, and friction means for controlling said positive means.

29. A gearless differential mechanism comprising a driving member, a pair of driven members, two-way clutches connecting said driving member with each of said driven members, positive means for partially disabling said clutches to permit the driven members to overrun said driving member, and friction means for controlling said positive means.

30. A gearless differential mechanism comprising a driving member, a pair of driven members, two-way clutches connecting said driving member with each of said driven members, positive means for partially disabling said clutches to permit the driven members to overrun said driving member, friction means for controlling said positive means and means adjustable at will to control said friction means.

31. A gearless differential mechanism comprising a driving member, a pair of driven members, two-way clutches connecting said driving member with each of said driven members, positive means for partially disabling said clutches to permit the driven member to overrun said driving member, friction means for controlling said positive means and means adjustable at will to control said friction means for governing said positive means for one direction of rotation of said members, said friction means being automatically operative to control said positive means upon rotation of the driving member in the opposite direction.

32. A gearless differential mechanism comprising a driving member, a pair of driven members, two-way clutches connecting said driving member with each of said driven members, either of said clutches being automatically disabled when its related driven member overruns the driving member and the other driven member, positive means for partially disabling both of said clutches to permit the driven members to overrun said driving member, and friction means for controlling said positive means.

33. A gearless differential comprising a driving member, a pair of driven members coaxial with said driving member, wedging elements adapted to be wedged between said driving and driven members to effect a two way driving connection in either direction, positive means for partially disabling said connections to permit said driven members to overrun said driving member, and yielding means rendered effective at will for controlling said positive means.

34. A gearless differential comprising a driving member, a pair of driven members coaxial with said driving member, wedging elements adapted to be wedged between said driving and driven members to effect a two way driving connection in either direction, positive means for partially disabling said connections to permit said driven members to overrun said driving member, and yielding means rendered effective at will for controlling said positive means, said positive means being automatically controlled to provide a two way connection whenever said driving member is rotated in one direction.

35. A differential mechanism comprising a driving member, a pair of driven members, two way connections between said driving and driven members for either direction of rotation, said connections permitting differential movement between said driven members, positive means for partially disabling said connections to permit said driven members to overrun said driving member, and friction means for controlling said positive means at will.

36. A gearless differential comprising a driving member, a pair of driven members coaxial with said driving member, wedging elements adapted to be wedged between said driving and driven members to effect a two way driving connection in either direction, positive means for partially disabling said connections to permit said driven members to overrun said driving member and means automatically operable for controlling said positive means to provide a two-way connection whenever said driving member is rotated in one direction.

37. In a device of the class described a driving member, a driven member, said members having relatively inclined surfaces, wedging elements adapted to be shifted relatively to one of said members to effect a driving connection for either direction of rotation, positive means for limiting the shifting of said elements, a friction drum for controlling said positive means, means frictionally engaging said drum, and means operable at will for arresting said last mentioned means to apply friction to said drum and control said positive means.

38. In a device of the class described a driving member, a driven member, said members having relatively inclined surfaces, wedging elements adapted to be shifted relatively to one of said members to effect a driving connection for either direction of rotation, positive means for limiting the shifting of said elements, friction means carried by one of said members and movable relative thereto, stops limiting the relative movement of said friction means, braking means for applying friction to said friction means to cause it to move relative to said one member, and resilient means for restoring said friction means upon release of said braking means.

39. In a device of the class described a driving member, a driven member, said members having relatively inclined surfaces, wedging elements adapted to be shifted relatively to one of said members to effect a driving connection for either direction of rotation, positive means for limiting the shifting of said elements, a friction drum for controlling said positive means, means for retaining said drum in a normal position relative to one of said members, said means permitting limited movement of the drum in either direction relative to said member and serving to restore the same to said normal position, and means for applying friction to said drum to cause it to shift relative to said members.

40. In a device of the class described a driving member, a driven member, said members having relatively inclined surfaces wedging elements adapted to be shifted relatively to one of said members to effect a driving connection for either direction of rotation, positive means for limiting the shifting of said elements, a friction drum for controlling said positive means, means for retaining said drum in a normal position relative to one of said members, said means permitting limited movement of the drum in either direction relative to said member and serving to restore the same to said normal position, and means for applying friction to said drum to cause it to shift relative to said member, said last mentioned means being automatically rendered effective upon rotation of said driving member in one direction.

41. In a device of the class described, a driving member, a driven member, said members having relatively inclined surfaces, wedging elements adapted to be shifted relatively to one of said members to effect a driving connection for either direction of rotation, a detent shiftable radially with respect to the axis of said members for limiting the shifting of said elements relative to said one member to partially disable said driving connection, and friction means for controlling the shifting of said detent.

42. In a device of the class described a driving member, a driven member, said members having relatively inclined surfaces, wedging elements adapted to be shifted relatively to one of said members to effect a driving connection for either direction of rotation, a pivoted detent for limiting the shifting of said elements relative to said one member to partially disable said driving connection, and friction means for controlling the rocking of said detent into and out of effective position.

43. In a device of the class described a driving member, a driven member, said members having relatively inclined surfaces, wedging elements adapted to be shifted relatively to one of said members to effect a driving connection for either direction of rotation, a pivoted detent for limiting the shifting of said elements relative to said one member to partially disable said driving connection and means for automatically rocking said detent out of effective position upon rotation of said driving member in one direction.

44. In a device of the class described a driving member, a driven member, said members having relatively inclined surfaces, wedging elements adapted to be shifted relatively to one of said members to effect a driving connection for either direction of rotation, a pivoted detent for limiting the shifting of said elements relative to said one member to partially disable said driving connection, said detent being pivoted on an axis parallel to that of said members, and friction means for controlling the rocking of said detent into and out of effective position.

45. In a device of the class described a driving member, a driven member, said members having relatively inclined surfaces, wedging elements adapted to be shifted relatively to one of said members to effect a driving connection for either direction of rotation, positive means for limiting the shifting of said elements, a friction member carried by said driving member for controlling the action of said positive means, means frictionally engaging said member, and a pawl adapted to arrest said last mentioned means in one direction of rotation of said driving member to automatically apply friction to said member.

46. In a device of the class described a driving member, a driven member, said members having relatively inclined surfaces, wedging elements adapted to be shifted relatively to one of said members to effect a driving connection for either direction of rotation, positive means for limiting the shifting of said elements, a friction member carried by said driving member for controlling the action of said positive means, means frictionally engaging said member, a pawl adapted to arrest said last mentioned means in one direction of rotation of said driving member to automatically apply friction to said member and a second pawl operable at will for arresting said means when said driving means rotates in the opposite direction.

47. In a device of the class described a driving member, a driven member, wedging elements interposed between the opposed faces of said members, a cage carrying said elements and shiftable in either direction relative to one of said members to effect a driving connection between said members in a corresponding direction, a pivoted detent for preventing said relative shifting of said cage in one direction, a friction element carried by one of said members and shiftable relative thereto, upon application of friction to control said detent, said detent having an arm cooperating with said cage and another arm cooperating with said friction element, and means for applying friction to said element.

48. In a device of the class described a driving member, a driven member, wedging elements interposed between the opposed faces of said members, a cage carrying said elements and shiftable in either direction relative to one of said members to effect a driving connection between said members in a corresponding direction, a pivoted detent for preventing said relative shifting of said cage in one direction, a friction element carried by one of said members and shiftable relative thereto in either direction, upon application of friction to control said detent, said detent having an arm cooperating with said cage and another arm cooperating with said friction element, and means for applying friction to said element at will to cause said element to shift relative to said one member in one direction, said means automatically applying friction to said element to cause shifting thereof in the opposite direction in response to rotation of said driving member in a given direction.

49. A differential mechanism comprising a driving member, a pair of driven members, two way connection between said driving and driven members for either direction of rotation, said connections permitting differential movements between said driven members, positive means for partially disabling said connections to permit said driven members to overrun said driving member and yielding means operable at will and automatically whenever said driving member is rotated in one direction for controlling said positive means.

50. Power transmission mechanism comprising a driving member, a driven member, wedging elements adapted to be wedged between surfaces on said members to effect a driving connection between the same in either direction, and means for preventing said elements from assuming a wedging relation with respect to said members when the driven member tends to rotate more rapidly than the driving member in one direction thereby permitting said driven member to rotate freely of said driving member, said means comprising a positive detent and frictionally controlled means for controlling said detent.

51. In a device of the class described a driving member, a driven member, said members having opposed surfaces with oppositely inclined wedging portions, wedging elements adapted to be shifted against certain of said portions when the driving member tends to rotate in one direction relative to the driven member and to be shifted against other of said portions when the driving member tends to rotate in the opposite direction relative to the driven member, said elements when left free serving to effect a driving connection between said members for rotation in either direction, a positive detent for preventing said elements from engaging certain of said wedging portions, thereby permitting free rotation of the driven member and frictionally controlled means for disabling said positive detent.

52. In a device of the class described a driving member, a driven member, said members having relatively inclined wedging surfaces, wedging elements adapted to be shifted relatively to said surfaces to effect a driving relation between said members when either tends to rotate relatively to the other in either direction, and means operable at will for limiting the shifting of said elements relative to said surfaces to permit free rotation of one of said members relative to the other, said means comprising a positive stop and frictionally controlled means for controlling said stop.

53. In a device of the class described a driving member, a driven member, said members having relatively inclined wedging surfaces, wedging elements adapted to be shifted relatively to said surfaces to effect a driving relation between said members when either tends to rotate relatively to the other in either direction, and means operable at will for limiting the shifting of said elements relative to said surfaces to permit free rotation of one of said members relative to the other, said means comprising a positive stop, frictionally controlled means for controlling said stop and means adjustable at will for controlling the application of said friction.

54. In a device of the class described a driving member, a driven member, said members having relatively inclined wedging surfaces, wedging elements adapted to be shifted relatively to said surfaces to effect a driving relation between said members when either tends to rotate relatively to the other in either direction, a movable detent adapted to limit the shifting of said elements relative to said surfaces to permit free rotation of one of said members relative to the other, a member controlled by friction for determining the position of said detent, and means operable at will for applying friction to said member.

55. In a device of the class described a driving member, a driven member, means for providing a two way connection between said members, positive means for disabling said connection in one direction, and independent means controlled at will by friction for governing said positive means.

56. In a device of the class described a driving member, a driven member, a two way clutch for connecting said members, positive means for partially disabling said clutch to permit the driven member to overrun the driving member, and friction controlled means operable at will for controlling said positive means.

57. In a device of the class described a driving member, a driven member, said members having relatively inclined surfaces, wedging elements adapted to be shifted relatively to one of said members to effect a driving connection for either direction of rotation, positive means for limiting the shifting of said elements, and means angularly movable on said driving member operable automatically to control said positive means upon rotation of said driving member in one direction.

In testimony whereof I have signed this specification.

DIMITRI SENSAUD DE LAVAUD.